United States Patent [11] 3,624,178

[72] Inventors Friedrich Lohse
  Allschell;
  Daniel Porret, Binningen; Willy Fatzer, Bottmingen, all of Switzerland
[21] Appl. No. 8,407
[22] Filed Feb. 3, 1970
[45] Patented Nov. 30, 1971
[73] Assignee Ciba Limited, Basel, Switzerland
[32] Priority July 19, 1966
[33] Switzerland
[31] 10404/66
  Continuation-in-part of application Ser. No. 653,314, July 14, 1967, now abandoned. This application Feb. 3, 1970, Ser. No. 8,407

[54] EPOXY TERMINATED POLYURETHANES
  16 Claims, No Drawings
[52] U.S. Cl. ..................................................260/830 TW,
  260/2 EP, 260/13, 260/14, 260/15, 260/18
  PN, 260/37 EP, 260/38, 260/39 R, 260/77.5 R,
  260/77.5 AM, 260/830 P, 260/831, 260/834
[51] Int. Cl. ....................................................... C08g 45/00,
  C08g 45/12, C08g 22/00
[50] Field of Search............................................ 260/830 P,
  830 TW, 77.5 R, 77.5 HM

[56] References Cited
UNITED STATES PATENTS

| | | | |
|---|---|---|---|
| 2,830,038 | 4/1958 | Pattison | 260/830 P |
| 3,158,586 | 11/1964 | Krause | 260/830 P |
| 3,284,375 | 11/1966 | Shokal | 260/2 |
| 3,459,828 | 8/1969 | Michelotti | 260/830 TW |
| 3,499,948 | 3/1970 | Jellinek | 260/830 TW |

Primary Examiner—Paul Lieberman
Attorneys—Harry Goldsmith, Joseph G. Kolodny and Mario A. Monaco ABSTRACT: An epoxy resin mixture containing (1) the polyepoxide of the formula

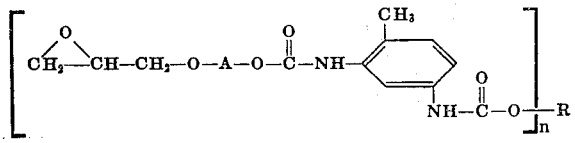

where $n$ is a whole number, at least 2, preferably 2 or 3, R stands for a n-valent aliphatic residue which may be interrupted by oxygen atoms and A represents the residue of a glycol or of a polyglycol whose terminal hydroxyl groups have been removed, and (2) the diglycidyl ether of a glycol or polyglycol.

EPOXY TERMINATED POLYURETHANES

CROSS REFERENCES TO RELATED APPLICATIONS

This application is a continuation-in-part application of our copending application Ser. No. 653,314, filed July 14, 1967, now abandoned.

The present invention provides polyglycidyl compounds which form elastic, shaped bodies when cured with curing agents for epoxy resins.

The polyepoxides of this invention correspond to the formula (I)
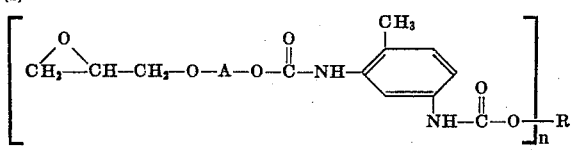

where $n$ is a whole number of at least 2 and at most 3, R is the radical which is obtained by removing the hydroxyl groups from a member selected from the group consisting of aliphatic saturated diol or triol of two to six carbon atoms, polyethylene glycol, polypropylene glycol and polybutylene glycol. A represents a residue selected from the group consisting of glycol with four to six carbon atoms and diglycol with four to six carbon atoms.

According to this invention the new polyepoxides containing urethane groups are obtained when a urethane preadduct of the general formula (II)
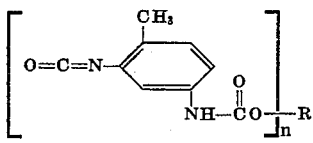

where $n$ is a whole number of at least 2 and at most 3 and R stands for an $n$-valent aliphatic residue of the same meaning as in formula (I) is reacted with a 1,2-epoxy alcohol of the formula (III)
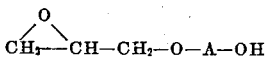

where A stands for the residue of a glycol ro diglycol with four to six carbon atoms whose terminal hydroxyl groups have been removed.

The starting compounds (II) belong to the known type of urethane preadducts ("urethane prepolymers") some of which are available in the market; they are obtained by adding a polyalcohol $R(OH)_n$ on to $n$ mols of toluylene-2,4-diisocyanate.

Preferred relevant polyalcohols $R(OH)_n$ are glycols, such as ethyleneglycol, propane-1,3-diol, propane-1,2-diol, 2-butene-1,4-diol, bis-(4-hydroxybutyl)ether, propane-1,3-diol, 1,1,1-trimethylolethane, 1,1,1-trimethylolpropane, pentaerythritol and polyglycols such as diethyleneglycol, triethyleneglycol, dipropyleneglycol and the higher polyglycols, such as the liquid and solid polyethyleneglycols, polypropylene-1,2 or -1,3-glycols, copolymers from ethylene oxide and propylene oxide, oxetan or tetrahydrofuran, poly(butylene-1,4-glycol), poly(hexylene-1,6-glycol) and also poly(propylene-1,2-glycol) whose terminal secondary hydroxyl group may have been converted into a primary hydroxyl group by an additive reaction with ethylene oxide.

Further suitable long-chain starting compounds of the formula $R(OH)_n$ are polyacetals containing terminal hydroxyl groups, which are obtained by copolymerizing alkylene oxides, such as ethylene or propylene oxide, with formaldehyde or trioxan, or from aldehydes, especially formaldehyde, and alcohols whose hydroxyl groups are separated from one another by at least 4 carbon atoms, such as butane-1,4-diol, pentane-1,5-diol, hexane-1,6-diol and decane-1,10-diol.

Further very suitable starting compounds $R(OH)_n$ are long chain, linear polyesters containing terminal hydroxyl groups, derived from such acids as oxalic, malonic, succinic, glutaric, methyladipic, sebacic, diglycollic, methylene-bis-thioglycollic, γ, γ'-sulpho-dibutyric, thiodibutyric, phthalic, isophthalic, terephthalic and especially adipic acid, the glycol component concerned being di-, tri- or polyethyleneglycol, propane-1,2- or -1,3-diol, butane-1,4, -1,3- or -2,3-diol, hexane-1,6-diol, decane-1,10-diol, octadecane-1,12-diol, 2,2-dimethyl-propane-1,3-diol, glycerol monomethyl ether or especially ethyleneglycol.

Polyols suitable for synthesizing the compounds (II), which contain at the same time sulfide groups, are obtained by using thioglycol, a polyglycol based on thioglycol or a polyester based on thioglycol, which contain terminal, primary hydroxyl groups. Instead of thiodiglycol there may be used bis(4-hydroxybutyl)thio ethers.

When $n$ is greater than 2, it is possible to use as starting materials $R(OH)_n$ for the polyisocyanates (II) also branched polyethers, polythioethers or polyesters. These products are obtained by using for the manufacture of the polyglycols polyalcohols in addition to glycols, or by using polyhydroxy compounds as initiators in the polymerization of alkylene oxides, such as ethylene or propylene oxide. Suitable polyhydroxy compounds are glycerol, pentaerythritol, sorbitol, mannitol, hexane-1,2,6-triol and trimethyolpropane. In a similar manner branched polyesters, which contain only terminal hydroxyl groups, may be used.

Further suitable starting compounds are those commercial urethane preadducts which contain partially reacted toluylene-2,4-diisocyanate residues and correspond to the formula (11), including products whose content of isocyanato groups has dropped somewhat owing to the action of moisture during storage. The polyisocyanates (II) are obtained by adding $n$ mols of toluylene-2,4-diisocyanate to 1 mol of the $n$-hydric polyol of the formula $R(OH)_n$ under mild conditions.

Suitable monoepoxy alcohols (III) are in the first place low-molecular monoglycidyl ethers of diols, such as butane-1,4-diol-monoglycidyl ether, pentanediol-1,5-monoglycidyl ether, hexane-1,6-diol-monoglycidyl ether and 3-cyclohexene-dimethanol-1,1-monoglycidyl ether and also diethyleneglycol-monoglycidyl ether and butane-1,3-diol-monoglycidyl ether.

In a special variant of the invention there are used the commercial mixtures obtained in the manufacture of the monoglycidyl ethers of the glycols and which, according to the route by which they have been obtained, may still contain a major share of the free glycols, or preferably a major share of the diglycidyl ethers of the glycols. Apart from the low-molecular commercial monoglycidyl ethers of the glycols the high-molecular monoglyciyl ethers of the above-mentioned polyglycols are of special value: they are obtained by reacting about 0.5 to about 2.5 mols of epichlorohydrin with one of the above-mentioned linear polyglycols. When such commercial monoglycidyl ethers are used to synthesize the diglycidyl ethers manufactured according to this invention, the final product contains as an accompanying mixture component the bisglycidyl ether of the polyglycol.

The addition of the epoxyalcohols on to the isocyanato group in position 2 of the polyisocyanates (II) consists in prolonged heating at a slightly raised temperature. Alternatively, the addition of the alcoholic hydroxyl group can be accelerated in known manner by adding basic compounds, especially tertiary amines such as triethylamine, pyridine, methylpyridine, N,N'-dimethylpiperazine, N,N-dimethylamino-cyclohexane and N,N'-endo-ethylenepiperazine but in this case, when the reaction turns out to be exothermic, it is necessary to dissipate the heat of reaction. As further suitable catalysts there may be mentioned metal salts, such as iron (III) chloride, zinc chloride, tin(II)chloride, tin octoate, acetylacetonates, such as iron and zinc acetylacetonate, and dibutyl tin dilaurate and molybdenum glycolate. Most of these products are viscous resins.

The polyepoxides of this invention react with the usual curing agents for polyepoxy compounds and can therefore be cross-linked or cured by addition of such curing agents in the same way as other polyfunctional epoxy compounds or epoxy resins. As such curing agents there are suitable basic and especially acidic compounds.

Good results have been achieved with the following:

Amines or amides, such as aliphatic or aromatic primary, secondary and tertiary amines, for example m-phenylenediamine, p-phenylenediamine, bis(p-aminophenyl)sulphone, bis(p-aminophenyl)methane, ethylenediamine, hexamethylenediamine, trimethylhexamethylenediamine,N,N2diethylethylenediamine, diethylenetriamine, tetra(hydroxyethyl)diethylenetriamine, triethylenetetramine, N,N-dimethylpropylenediamine, bis(4-aminocyclohexyl)methane, bis(4-aminocyclohexyl)dimethylmethane, 3-(aminomethyl-3,5,5-trimethylcyclohexylamine, Mannich's bases such as 2,4,6-tris(dimethylaminomethyl)-phenol; dicyandiamide, urea-formaldehyde resins, melamine-formaldehyde resins; polyamides, for example those from aliphatic polyamines and dimerized or trimerized unsaturated fatty acids; polyhydric phenols, for example resorcinol, bis(4-hydroxyphenyl)dimethylmethane, phenol-formaldehyde resins, reaction products of aluminum alcoholates or phenolates with compounds of tautomeric reaction of the acetoacetic acid ester type, Friedel-Crafts catalysts, for example $AlCl_3$, $SbCl_5$, $SnCl_4$, $ZnCl_2$, $BF_3$ and their complexes with organic compounds, for example $BF_3$-amine complexes, metal fluoroborates such as zinc fluoroborate, phosphoric acid; boroxines such as trimethoxyboroxine.

Preferred curing agents are polybasic carboxylic acids and their anhydrides, for example the anhydrides of the following acids: Phthalic, tetrahydrophthalic, hexahydrophthalic, methylhexahydrophthalic, endomethylene-tetrahydrophthalic, methyl-endomethylene-tetrahydrophthalic (=methyl nadic anhydride), hexachloro-endomethylene-tetrahydrophthalic, succinic, adipic, maleic, allylsuccinic, dodecenylsuccinic acid; 7-allyl-bicyclo(2.2.1)-hept-5-ene-2,3-dicarboxylic acid and also pyromellitic dianhydride or mixtures of such anhydrides. Curing agents that are liquid at room temperature are preferred.

If desired, there may be additionally used accelerators, such as tertiary amines or their salts or quaternary ammonium compounds, for example tris(dimethylaminomethyl)phenol, benzyldimethylamine or benzyldimethyl ammonium phenolate, tin(II)salts of carboxylic acids, such as tin(II)octoate or alkali metal alcoholates, such, for example, as sodium hexylate.

As a rule, however, the additional use of such accelerators is not necessary and this is a special advantage of the new polyepoxy compounds of this invention over most known cycloaliphatic polyepoxy compounds.

For curing the polyepoxides of this invention with anhydrides it is advantageous to use for every gram equivalent of epoxide groups 0.5 to 1.1 g. equivalents of anhydride groups.

Optimal properties of the cured products are in general achieved by using one equivalent of anhydride group for every equivalent of epoxide groups. When, however, an accelerator containing hydroxyl groups is used additionally, it is advantageous to increase the quantity of anhydride curing agent added.

The term "curing" as used in this context describes the conversion of the above polyepoxides into insoluble and infusible, cross-linked products, as a rule together with shaping to furnish shaped bodies, such as castings, mouldings or laminates or flat structures such as lacquer films or cemented products.

Accordingly, the present invention also provides curable mixtures containing the polyepoxides of this invention, possibly in combination with other diepoxy or polyepoxy compounds and furthermore curing agents for epoxy resins, preferably anhydrides of dicarboxylic or polycarboxylic acids.

Furthermore, the polyepoxy compounds of this invention and their mixtures with other polyepoxide and/or curing agents may be admixed at any stage prior to the curing operation with fillers, plasticizers, pigments, dyestuffs, flame-inhibitors or mould lubricants.

Suitable extenders and fillers are, for example, asphalt, bitumen, glass fibers, cellulose, mica, quartz meal, aluminum hydroxide, gypsum, kaolin, ground dolomite, colloidal silica having a large specific surface (AEROSIL) or metal powders, such as aluminum powder.

The cured mixtures may be used in the unfilled or filled state, if desired, in the form of solutions or emulsions, as textile assistants, coating agents, laminating resins, paints, lacquers, dipping resins, casting resins, moulding resins, moulding compositions, brushing compounds, pore fillers, floor coverings, potting and insulating compounds for the electrical industry, adhesives or for the manufacture of such products.

Manufacture of the glycidyl ethers containing hydroxyl groups or of mixtures containing such glycidyl ethers, used as starting materials in the following examples The pressure is indicated in mm. Hg. The indicated values for the epoxide equivalents per kg. have been determined by the method described by A. J. Durbetaki in Analytical Chemistry, volume 28, No. 12, Dec. 1956, pages 2000–2001, with the use of hydrogen bromide in glacial acetic acid.

I. Manufacture of butane-1,4-diol-monoglycidyl ethers

A. Manufacturing the crude product

A mixture of about 1,080 g. (12 mols) of butane-diol-1,4 and 3,366g. (36 mols) of epichlorohydrin is heated with a heating bath to about 65° C. in a 6-liter flask equipped with agitator, reflux condenser, internal thermometer and a closable neck for the portionwise addition of sodium hydroxide. During about 1½ hours, a total of 540 g. (13.2 mols) of sodium hydroxide (of about 98 percent purity) was added in 10 equal portions, while the external temperature, which initially had been kept at about 70° C., was lowered first to about 40° C. and towards the end of the addition of sodium hydroxide to 30° C. The addition of each successive portion of sodium hydroxide was made after the evolution of heat due to the precedingly added portion had subsided so far that the internal temperature had again risen to about 60° C. When all sodium hydroxide had been added, an azeotropic mixture of epichlorohydrin and water of reaction was distilled off with a descending condenser, during which the distillation temperature was about 110° C. After cooling to room temperature, the precipitated sodium chloride was filtered off and the salt rinsed with a small quantity of epichlorohydrin. The excess epichlorohydrin was then distilled off from the combined filtrates through a Vigreux column under a pressure of about 120 mm. Hg. and towards the end of about 12 mm. Hg. until the internal temperature was about 120° C. and the external temperature was 125° C. The residue (1,850 g.) in the flask was a brown, clear liquid of low viscosity, which is referred to below as "crude product."

B. Manufacturing pure butane-1,4-diol-monoglycidyl ether

The 1,850 g. of crude product were distilled through a Claisen head with a descending condenser under about 0.1 mm. Hg. in the crude form, until the distillation temperature had reached about 180° C. to yield about 1,350 g. of a colorless, clear distillate of low viscosity. The residue in the flask weighed about 480 g.

The 1,350 g. of distillate were subjected to a fractional distillation on a column of 35 cm. length, which was filled with rings of stainless steel fabric and which carried a dephlegmator. The fractions passing over at a distillation temperature of about 80° C., under pressure of about 0.01 mm. Hg. were, for as long as they revealed an epoxide equivalent of 6.7 to 6.85 per kg., collected separately. There were obtained 580 g. of a butanediol-1,4-monoglycidyl ether which revealed a purity of 98.1 percent in gas chromatography; it contained 6.77 (theory: 6.84) epoxide equivalents per kg.

$C_7H_{14}O_3$. Molecular weight: 146.18

| | | | |
|---|---|---|---|
| calculated: | C 57.51 | H 9.65 | O 32.84% |
| found: | 57.71 | 9.65 | 33.14% |

C. Commercial butanediol-1,4-monoglycidyl ether

Using the method described for the manufacture of the crude product and starting from 405 g. (4.5 mols) of butane-1,4-diol, 1,250 g. (13.5 mols) of epichlorohydrin and 202 g. of NaOH (98 percent) [4.95 mols] 640 of a crude product freed from epichlorohydrin were obtained; from this crude product without previous crude distillation on the column as described for the isolation of butanediol-1,4-monoglycidyl ether, the lower boiling initial fractions having a high-epoxide content (15 g.) were removed. The sum of the following fractions (until the content of epoxide equivalents per kg. had begun to drop again after reaching a maximum of 9.0 to 9.88) furnished 402 g. of commercial butanediol-1,4-monoglycidyl ether containing 6.7 epoxide equivalents per kg. and containing a major share of the diglycidyl ether of butanediol-1,4 and still a small quantity of butanediol-1,4.

II. Manufacture of hexanediol-1,6-monoglycidyl ether

From a batch containing 826 g. of commercially pure hexanediol-1,6 and 1,050 g. of toluene, introduced into a 2,5-liter flask equipped with agitator, internal thermometer, dropping funnel and descending condenser, about 450 g. of toluene was distilled off to remove water, and the mixture was then cooled to an internal temperature of 50° C. The descending condenser was replaced by a reflux condenser and 7 ml. of tin tetrachloride were added to the mixture. Within about 70 minutes a total of 648 g. of epichlorohydrin was dropped in, while keeping the internal temperature at 50° to 51° C, by lowering the temperature of the bath of initially 50° C gradually to 33° C and then raising it again to 50° C only towards the end of the epichlorohydrin addition. The batch was allowed to react for 15 minutes longer at this temperature and then cooled to room temperature. The dropping funnel was removed from the apparatus. At a bath temperature of 20° C, within about 20 minutes, a total of 343 g. of 98 percent sodium hydroxide was added in small portions, whereby the internal temperature was caused to rise to about 30° C. Within another 10 minutes, the mixture was heated to an internal temperature of 50° C., then kept for ½ hour at this temperature and then cooled to room temperature. The precipitated sodium chloride was filtered off and washed with toluene. From the combined filtrates the volatile ingredients were distilled off under a water-jet vacuum at a bath temperature rising to about 90° C. The residue in the flask (1,218 g.) was a crude product containing the hexanediol-1,6-monoglycidyl ether.

The 1,218 g. of crude product were distilled through a Vigreux column under a pressure of about 0.1 mm. Hg. up to a bath temperature of 240° C. and a distillation temperature of 160° C., to yield 1,133 g. of commercial hexanediol-1,6-monoglycidyl ether containing 5.4 epoxide equivalents per kg. The residue in the flask weighed 41 g. 1,125 grams of the commercial hexanediol-1,6-monoglycidyl ether obtained were subjected to fractional distillation on a 35 cm. long column filled with stainless steel fabric rings and equipped with a dephlegmator, under a pressure of about 0.1 mm. Hg. The constituents passing over between about 80° and 90° C. were collected separately for as long as they contained 5.7 to 6.0 epoxide equivalents per kg. (total 270 g.). These 270 g. were subjected to another fractional distillation on the same column, and the fractions passing over at 87° to 93° C under 0.01 mm. Hg. pressure having a content of 5.7 to 5.8 epoxide equivalents per kg. were again collected separately. Yield: a total of 245 g. of hexanediol-1,6-monoglycidyl ether containing 5.27 (theory: 5.74) epoxide equivalents per kg.

Combustion analysis:
$C_9H_{18}O_3$. Molecular weight: 174.23

| | | | |
|---|---|---|---|
| calculated | C 62.04 | H 10.41 | O 27.55% |
| found: | 62.31 | 10.48 | 27.70%. |

III. Manufacture of 2,2-dimethylpropanediol-1,3-monoglycidyl ether 280 grams of a mixture containing the monoglycidyl and the diglycidyl ethers, prepared as described below, was subjected to fractional distillation under a water-jet vacuum (12mm. Hg.) in a 35 cm. long column filled with wire fabric rings of stainless steel and equipped with a dephlegmator. The fractions containing 6.2 epoxide equivalents per kg. and passing over at 119° to 120° C. under 12 mm. Hg. pressure (total 68 g) were collected separately; they consisted of the monoglycidyl ether of 2,2-dimethylpropanediol-1,3-which revealed the following combustion analysis:

$C_8H_{16}O_3$

| | | |
|---|---|---|
| calculated: | C 59.98 | H 10.07% |
| found: | 60.11 | 10.31%. |

According to its gas chromatogram the product was of 98.2 percent purity.

The above mentioned mixture, containing the monoglycidyl and diglycidyl ether of 2,2-diemthylpropanediol-1,3, was obtained thus:

312 grams of 2,2-dimethylpropanediol-1,3, 1,560 g. of toluene and 390 g. of epichlorohydrin were mixed in a 2,5-liter flask equipped with condenser, agitator, internal thermometer and closable neck (for the subsequent addition of sodium hydroxide), then 3 ml. of tin tetrachloride were added and the whole was heated on a water bath to 40° C, whereupon a clear solution resulted. Inside of about 2½hours the bath temperature and the internal temperature were raised to about 48° C and thus maintained for about 2 hours, and then another 2 ml. of tin tetrachloride were added to the reaction mixture. The bath and internal temperature were maintained at 50° C for about 1½ hours longer and the batch was then cooled to about 15° C.

At a bath temperature of 5° to 10° C 172 g. of sodium hydroxide of 98 percent purity was added portionwise within about 10 minutes at an internal temperature not exceeding about 25° C. Within about ½ hour the internal temperature was raised to about 50° C and thus maintained for about 20 minutes.

The batch was then cooled to room temperature. The precipitated sodium chloride was filtered off and rinsed twice with toluene. The unreacted epichlorohydrin and the toluene were distilled out of the combined filtrates under a water-jet vacuum to a bath temperature of about 90° C.

There were obtained 512 g. of a liquid, faintly brownish residue in the flask; it contained 5.3 epoxide equivalents per kg. This crude product contained the monoglycidyl and the diglycidyl ethers of 2,2-diemthylpropanediol-1,3.

From 485 g. of the crude product obtained the volatile constituents were distilled off through a Vigreux column under a pressure of about 0.1 mm. Hg. up to a distillation temperature of 90° C (bath temperature about 160° C., internal temperature about 150° C.).

There were obtained as distillate 290 g. of colorless, clear, commercial 2,2-dimethylpropanediol-1,3-monoglycidyl ether containing 7.4 epoxide equivalents per kg. and a major share of the diglycidyl ether.

As forerunning in the fractional distillation of the commercial monoglycidyl ether there were obtained fractions containing partially crystalline, that is to say unreacted, 2,2-diemthylpropanediol-1,3.

The fractions passing over at 156° C. under 18 mm. Hg., following upon the monoglycidyl ether, insofar as they contain 9.14 to 9.28 epoxide equivalents per kg., consist of 104 g. of pure diglycidyl ether of 2,2-diemthylpropanediol-1,3.

IV. Manufacture of diethyleneglycol-monoglycidyl ether

A. Manufacturing the crude product

The procedure described above under "I. Manufacture of butane-1,4-diol-monoglycidyl ether" was substantially adopted.

There were used 530 g. of diethyleneglycol (5 mols), 185 g. of epichlorohydrin (20 mols) and 205 g. of sodium hydroxide (5 mols). After evaporation there were obtained 786 g. of crude product containing 5.24 epoxide equivalents per kg.

B. Manufacturing the diethyleneglycol-monoglycidyl ether

The 786 g. of the above crude product were first subjected to a coarse distillation under a pressure of about 0.1 mm. Hg. through a Claisen head up to an internal temperature of about 160° C. (distillation temperature about 125° C.), to furnish 618 g. of coarse distillate containing 5.8 epoxide equivalents per kg.

The aforementioned 618 g. were then subjected to a fine fractionation under a pressure of about 0.1 mm. Hg. and those fractions which contained 5.5 to 6.2 epoxide equivalents per kg. were collected separately. The corresponding range of the distillation temperature was 80° to 86° C. The 299 g. of the resulting fine distillate contained 6.17 epoxide equivalents per kg. (theory demands 6.166). Gas chromatography revealed a content of 97.1 percent by weight of diethyleneglycol-monoglycidyl ether.

C. Commercial diethyleneglycol-monoglycidyl ether

When the previously mentioned crude product was distilled through a Vigreux column under a water-jet vacuum, while continuously checking the epoxide content of the phases that passed over, these values initially dropped significantly while passing through a minimum at about 3.8 epoxide equivalents per kg. (at a distillation temperature of about 130° C.), then they rose slowly and passed a maximum at about 8.5 epoxide equivalents per kg. The distillation was discontinued immediately after this maximum was passed (distillation temperature 175° C.). In this manner, 500 g. of crude product yielded 300 g. of distillate containing 6.0 epoxide equivalents per kg., designated as "coarse distillate type B."

The distillation described above was repeated, and discontinued when the epoxide content after passing the minimum of about 3.8 epoxide equivalents per kg. had risen again to about 5 epoxide equivalents per kg. (distillation temperature 138° C.). The shares that The had passed over up to that point were not considered. The subsequent shares up to immediately after passing the maximum of about 8.5 epoxide equivalents per kg. yielded 200 g. of distillate containing 6.7 epoxide equivalents per kg. and were designated as "coarse distillate type A."

V. Manufacturing butane-1,3-diol-monoglycidyl ether 180 grams (2 mols) of distillate butane-1,3-diol was added to a solution of 1 ml. of boron trifluoride diethyl etherate in ½ liter of absolute toluene. Then 203.5 g. (2.2 mols) of epichlorohydrin were dropped into this reaction mixture so that the exothermic reaction, if necessary aided by external heating, enabled the temperature to be maintained at 67° to 71° C. When all epichlorohydrin has been added, the batch was allowed to react for 4½ hours longer at 70° to 71° C. Then 80 g. (2 mols) of powdered sodium hydroxide were added to the cooled reaction mixture so that the exothermic reaction kept the temperature constant at 40° C. On completion of the addition the batch was allowed to react for 40 minutes longer at the same temperature, then it was filtered and distilled. The fraction passing over between 60° C. under 0.09 mm. Hg. and 79° under 0.09 mm. Hg. pressure had a hydroxyl equivalence weight of 162.0 and an epoxide equivalence weight of 138.5; it weighed 140 grams.

This crude product, which still contained butane-1,3-diol, butane-1,3-diol-diglycidyl ether and mainly the two isomeric butane-1,3-diol-monoglycidyl ethers, was used for the manufacture of epoxy resin as it was.

Example 1

174 grams of toluylene-2,4-diisocyanate were mixed with 206 g. of polyethyleneglycol (mean molecular weight 412; mean hydroxyl equivalent weight 206), whereupon a faintly exothermic reaction set in. The reaction mixture was maintained, with stirring and exclusion of moisture, first by slight cooling and after the exothermic reaction had subsided by additional heating at 35° to 40° C. until an isocyanate equivalent weight from 370 to 390 was reached, which was the case after about 2½ to 3 hours. The progress of the reaction was checked by repeated determination of the isocyanate equivalent weight by titrating the excess of a predetermined quantity of dibutylamine solution (according to E. Muller, in Houben-Weyl, Methoden der organischen Chemie, 4th edition 14/2, page 85 [1961]). 147 grams of 98.1 percent butane-1,4-diol-monoglycidyl ether were added to 380 g. of the isocyanate preadduct having an isocyanate equivalent weight of 380 obtained above, and the whole was heated at 40° C. until a content of isocyanate was no longer detected, which took about 10 hours.

The reaction product was a viscous epoxy resin containing 2.0 epoxide equivalents per kg., which consisted substantially of the compound of the formula

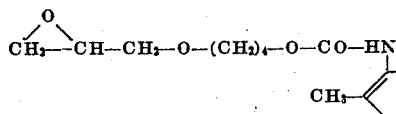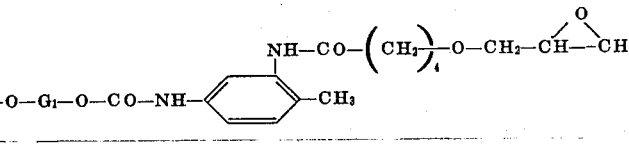

in which $G_1$ represents the residue of a polyethyleneglycol HO—$G_1$—OH, whose terminal hydroxyl groups have been removed, having a mean molecular weight of 412.

The resulting epoxy resin was cured at an elevated temperature with hexahydrophthalic anhydride. The specimens revealed the following mechanical properties:

Tensile strength  (VSM 77 101)   1.9 kg./mm.²
elongation at rupture  (VSM 77 101)  70 percent.

Example 2

56.7 grams of polybutyleneglycol (mean molecular weight 654; mean hydroxyl equivalent weight 327) were mixed with 30.4 g. of toluylene-2,4-diisocyanate, whereupon a weakly exothermic reaction set in. While stirring the reaction mixture with exclusion of moisture, it was heated at 70° to 80° C until titration according to example 1 revealed a content of only 1.95 to 2.05 isocyanate equivalents per kg. 51.3 grams of the resulting viscous product, having an isocyanate equivalent weight of 513, were mixed with 14.7 g. of 98.1 percent butane-1,4-diol-monoglycidyl ether and heated at 60° to 70° C until isocyanate could no longer be detected, which took about 4 to 5 hours. The resulting product was an epoxy resin containing 1.46 epoxide equivalents per kg., consisting substantially of the compound of the formula

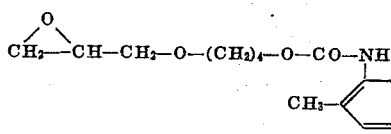

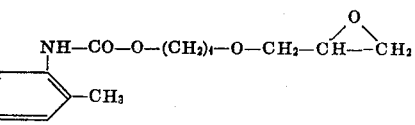

where $G_2$ is the residue of the polybutyleneglycol $HO-G_2-OH$, which has been freed from its terminal hydroxyl groups, of mean molecular weight 654.

After curing with 2,2,4-trimethyl-1,6-diaminohexane, flexible, rubber-elastic castings were obtained.

Example 3

174 grams of toluylene-2,4-diisocyanate were mixed with 490 g. of polybutyleneglycol (mean molecular weight 980; mean hydroxyl equivalent weight 490), whereupon a weakly exothermic reaction set in. While excluding moisture and stirring the mixture it was maintained at 30° C. until the isocyanate equivalent weight reached 650 to 670, which was the case after about 3½ to 4 hours.

664 grams of the preadduct obtained above, of isocyanate equivalent weight 666, were mixed with 146 g. of 98 percent butane-1,4-diol-monoglycidyl ether, and the whole was stirred and heated at 50° C. until isocyanate could no longer be detected. The product obtained was a viscous epoxy resin containing 1.28 epoxide equivalents per kg., consisting substantially of the compound of the formula

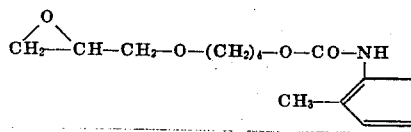

where $G_3$ represents the residue of the polybutyleneglycol $HO-G_3-OH$, whose terminal hydroxyl groups have been removed, having a mean molecular weight of 980.

Example 4

174 grams of toluylene-2,4-diisocyanate were mixed with 220 g. of polypropyleneglycol (mean molecular weight 440; mean hydroxyl equivalent weight 220), whereupon an exothermic reaction set in. The reaction mixture was maintained at 40° to 50° C., initially by slight cooling and after the exothermic reaction has subsided by additional heating, while stirring and with exclusion of moisture, until the isocyanate equivalent weight was between 380 and 400, which took about 4 hours.

393 grams of the product obtained above, having an isocyanate equivalent weight of 390 were mixed with 146 g. of 98.1 percent butane-1,4-diol-monoglycidyl ether and the whole was stirred and heated at 50° C., until isocyanate could no longer be detected, which took about 6 hours. The product was a yellowish, viscous epoxy resin containing 2.12 epoxide equivalents per kg., consisting substantially of the compound of the formula

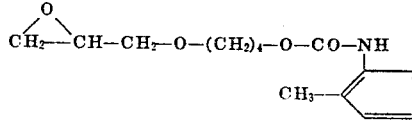

in which $G_4$ represents the residue of the polypropyleneglycol $HO-G_4-OH$, freed from its terminal hydroxyl groups, of mean molecular weight 440.

The resulting epoxy resin was cured at an elevated temperature with hexahydrophthalic anhydride. The specimens revealed the following mechanical properties:

Tensile strength (VSM 77 101)  2.4 kg./mm.²
elongation at rupture (VSM 77 101)  77 percent.

Example 5

While stirring a mixture of 394 g. of polyethyleneglycol (mean molecular weight 874; mean hydroxyl equivalent weight 437) and 177 g. of toluylene-2,4-diisocyanate with exclusion of moisture it was allowed to react at 40° to 50° C. after an initial exothermic reaction; the previously calculated isocyanate equivalent weight of 590 to 610 was reached after about 5 hours.

The resulting preadduct, having an isocyanate equivalent weight of 598, was mixed with 134 g. of 98.1 percent butane-1,4-diol-monoglycidyl ether, and the reaction mixture was heated at 50° to 60° C. until isocyanate could no longer be detected, which took about 8 hours. The resulting waxy epoxy

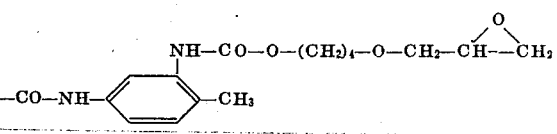

resin contained 1.63 epoxide equivalents per kg. and consisted substantially of the compound of the forumla

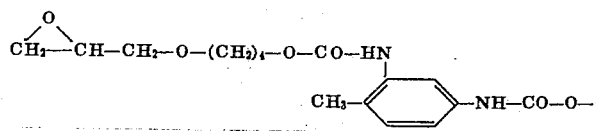

in which $G_5$ represents the residue of the polypropyleneglycol $HO-G_5-OH$, whose terminal hydroxyl groups have been removed, having a mean molecular weight of 874.

Example 6

72.1 grams of ADIPREN L-100 (commercial product of Messrs. DuPont, Wilmington Del. U.S.A.; an adduct from polybutyleneglycol and toluylenediisocyanate), which by absorption of water had a residual content of only 1.39 isocyanate equivalents per kg., was mixed with 16.5 g. of distilled 2,2-dimethylpropanediol--monoglycidyl ether of 98.2 percent purity, and the mixture was heated at 70° C. until isocyanate could no longer be detected.

The total reaction time was 4 to 5 hours. The resulting product was a yellowish, waxy epoxy resin containing 1.17 epoxide equivalents per kg.

On curing the resin with hexamethylenediamine, flexible, notch-resistant castings were obtained.

Example 7

200 grams of absolute chlorobenzene were mixed with 24.8

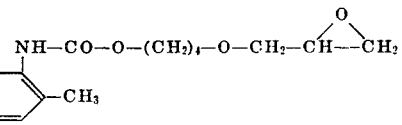

g. (0.4 mol) of freshly distilled ethyleneglycol and 139.0 g. (0.8 mol) of toluylene-2,4-diisocyanate, whereupon an exothermic reaction set in, but it could be contained at 35° to 37° C. by slight cooling. After about 1 hour the reaction mixture was homogenous. The progress of the reaction was checked by repeated determination of the isocyanate equivalent weight of the reaction mixture. When the value approached the calculated limit value of 454 (consumption of half of all isocyanate groups), 147.5 g. (0.8 hydroxyl equivalent) of hexamethyleneglycol-monoglycidyl ether of 95.1 percent purity epoxide equivalent weight 171; hydroxyl equivalent weight 185) were added. The reaction mixture was then heated for 4 hours at 40° C and then for 7 hours at 50° C., after which isocyanate groups could no longer be detected. For working up all chlorobenzene was evaporated, towards the end under a high vacuum. The product was a yellow epoxy resin which no longer flowed at room temperature and contained 2.86 epoxide equivalents per kg., consisting substantially of the compound of the formula 396 grams of the resulting epoxy resin were heated to 80° C. and thoroughly mixed with 99 g. of 4,4'-diaminodiphenylmethane. After having removed, the air bubbles the mixture was poured into preheated stretch moulds and heated for 16 hours at 100° C. The stretch specimens revealed the following strength values:
Tensile strength (VSM 77 101) 6.42 kg./mm.²
elongation at rupture (VSM 77 101) 4 percent Example 9

A suspension of 48.8 g. (0.4 mol) of thiodiethyleneglycol in 200 g. of absolute chlorobenzene was mixed with 139.0 g. (0.8 mol) of toluylene-2,4-diisocyanate. The resulting suspension was stirred and heated to 36° to 37° C., during which after about 25 to 30 minutes the reaction mixture became homogenous. The progress of the reaction was observed by repeated determination of the isocyanate content of the reaction mixture. When the isocyanate content had dropped to half its initial value and was approaching the calculated isocyanate equivalent weight of 484, 129.5 g. (0.8 mol) of

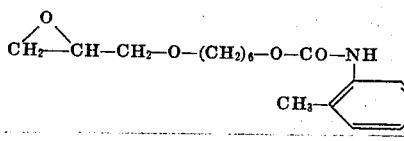 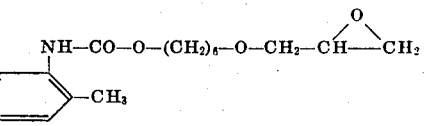

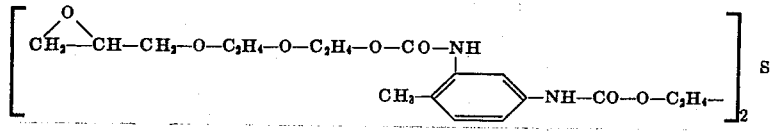

52.3 grams of the epoxy resin thus obtained were heated to 50° C. with 133 g. of Δ⁴-tetrahydrophthalic acid-diglycidyl ester containing 6.4 epoxide equivalents per kg. and then intimately mixed with 59.4 g. of commercial trimethylhexamethylenediamine (mixture of isomers of 2,4,4-trimethyl- and 2,2,4-trimethylhexamethylenediamine). After a short vacuum treatment to remove the air bubbles, the mixture was poured into preheated stretch moulds and heated for 3 hours at 90° C. The stretch specimens revealed the following mechanical properties:
Tensile strength (VSM 77 101) 5.50 kg./mm.² diethyleneglycol-monoglycidyl ether of 98.6 percent purity were added at an isocyanate equivalent weight of 462 and the reaction mixture was heated for 4 hours at 40° to 41° C. and then for 2 hours at 50° to 51° C. After this time, isocyanate groups could no longer be detected. The chlorobenzene was then evaporated and the epoxy resin concentrated at a bath temperature of 60° C. under 0.005 mm. Hg. pressure until its weight remained constant. A quantitative yield of a highly viscous yellow product was obtained; it contained 2.36 epoxide equivalents per kg. and consisted substantially of the compound of the formula

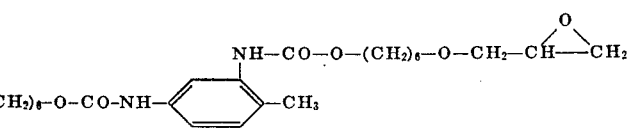

elongation at rupture (VSM 77 101) 4 percent.

Example 8

A suspension of 47.2 g. (0.4 mol) of hexamethyleneglycol in 200 g. of absolute chlorobenzene was mixed with 139.0 g. (0.8 mol) of toluylene-2,4-diisocyanate. While stirring the suspension vigorously, it was heated to 33° C. and the progress of the reaction was checked by repeated determination of the isocyanate equivalent weight; when it has reached a value of 484, 147.5 g. (0.8 hydroxyl equivalent weight) of hexamethyleneglycol-monoglycidyl ether (of 95.1 percent purity; epoxide equivalent weight 171; hydroxyl equivalent weight 185) and 200 g. of absolute chlorobenzene were added. The reaction mixture reacted weakly exothermically after this addition and was then raised to 40° C. by external heating. A homogenous solution was obtained only as the reaction progressed. After a reaction time of 6 hours at 40° C. and 5 hours at 50° C., isocyanate groups could no longer be detected. The reaction mixture was concentrated and finally heated at 80° C. under 0.005 mm. Hg. pressure until its weight was constant, to give a quantitative yield of viscous, yellowish epoxy resin containing 2.52 epoxide equivalents per kg., consisting substantially of the compound of the formula 42,3 grams of the resulting epoxy resin with 15.4 g. of hexahydrophthalic anhydride were heated to 80° C. and thoroughly mixed and heated for 16 hours at 100° C, whereupon a hard casting of high toughness and good adhesion to glass was obtained.

Example 10

204.5 grams (0.32 hydroxyl equivalent) of a polyester containing hydroxyl groups [prepared by the usual esterification process from 4 mols of sebacic acid and 5 mols of 1,6-diol with a hydroxyl equivalent weight of 637] were dissolved at 55° C. in 400 g. of chlorobenzene and the solution was cooled to 25° C. On cooling, the ester crystallized out again partially. Then 55.6 g. (0.32 mol) of toluylene-2,4-diisocyanate were added, whereupon an exothermic reaction set in and the reaction mixture soon became homogenous. The temperature was kept at 36° to 37° C. by cooling with ice. The progress of the reaction could be checked by repeated determination of the isocyanate content. When the isocyanate equivalent weight of the reaction mixture approached the calculated value of 2,060 (isocyanate equivalent weight of the reaction mixture at which only half the originally present isocyanate groups are left),

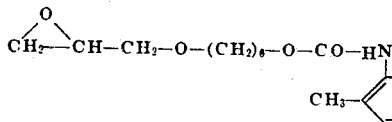

48.2 g. (0.32 hydroxyl equivalent) of butane-1,4-diol-monoglycidyl ether of 95.8 percent purity (epoxide equivalent weight 146.0; hydroxy equivalent weight 150.5) were added. The batch was then allowed to react for 3 hours at 40° C. and for 5 hours at 50° C., after which no more isocyanate groups could be detected. The batch was concentrated, towards the end under 0.01 mm. Hg. pressure at a bath temperature of 90° C., to yield a light-brown epoxy resin which was solid at room temperature and contained 1.12 epoxide equivalents per kg.

893 grams of this epoxy resin were heated to 80° C. and thoroughly mixed with 42.5 g. of 3-(aminomethyl)-3,5,5-trimethyl-cyclohexylamine. After a short vacuum treatment to remove the air bubbles, the mixture was poured into preheated stretch molds and heated for 16 hours at 100° C. The stretch specimens revealed the following strength values:

| Tensile strength | (VSM 77 101) | 1.00 kg./mm.² |
| elongation at rupture | (VSM 77 101) | 200%. |

EXAMPLE 11

By the method described above 80.3 g. (0.44 hydroxyl equivalent) of a polyester containing hydroxyl groups [prepared by the usual esterification method from 4 mols of adipic acid and 8 mols of butane-1,4-diol; hydroxyl equivalent weight 181] were dissolved at 37° C. in 400 g. of chlorobenzene, and 77.4 g. (0.44 mol) of toluylene-2,4-diisocyanate were added. Shortly before the isocyanate equivalent weight of the reaction mixture had reached the calculated value of 1,265, 72.0 g. (about 0.44 hydroxyl equivalent) of 98.2 percent diethyleneglycol-monoglycidyl ether were added. After further reaction and working up a light-brown epoxy resin was obtained which was crystalline at room temperature and contained 1.83 epoxide equivalents per kg.

89.3 grams of the resulting epoxy resin together with 15.4 g. of hexahydrophthalic anhydride were heated to 80° C and the whole allowed to react for 4 hours at 40° C. and then for 5 hours at 50° C., after which isocyanate groups could no longer be detected. The relatively low-viscous resin contained 1.49 epoxide equivalents per kg. and consisted substantially of the compound of the formula

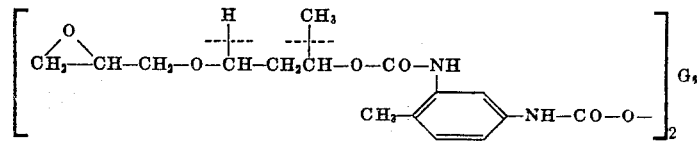

in which $G_6$ represents the residue of the polybutyleneglycol HO—$G_6$—OH, whose terminal hydroxyl groups have been removed, of mean molecular weight 900.

100 grams of the epoxy resin thus obtained were heated to 80° C. with 133 g. of $\Delta^4$-tetrahydrophthalic acid-diglycidyl ester containing 6.4 epoxide equivalents per kg. and then thoroughly mixed with 42.5 g. of 3-(aminomethyl)-3,5,5-trimethyl-cyclohexylamine. After a short vacuum treatment to remove the air bubbles, the mixture was poured into preheated stretch molds and heated for 3 hours at 90° C. The stretch specimens revealed the following properties:
Tensile strength  (VSM 77 101)  6.00 kg./mm.²
elongation at rupture  (VSM 77 101)  5 percent.

Example 13

200 grams of chlorobenzene were mixed with 33.2 g. (0.25 mol) of 1,1,1-trimethylolpropane and 130.0 g. (0.75 mol) of toluylene-2,4-diisocyanate. The reaction mixture was maintained at 40° to 45° C. initially by cooling and then by heating. When the isocyanate equivalent weight of the reaction mixture had reached 452 (calculated value 486), 119.0 g. (0.75 hydroxyl equivalent weight) of diethyleneglycol-monoglycidyl ether (of 97.4 percent purity; hydroxyl equivalent weight 158.5; epoxide equivalent weight 163.0) were added and the whole was allowed to react further for 1 hour at 40° C. and then for 7 hours at 50° C. On completion of the reaction the turbid reaction mixture was filtered through a pressure filter and finally heated at 80° C. under 0.05 mm. Hg. pressure until its weight remained constant. A viscous epoxy resin was obtained which contained 2.39 epoxide equivalents per kg. and consisted substantially of the compound of the formula

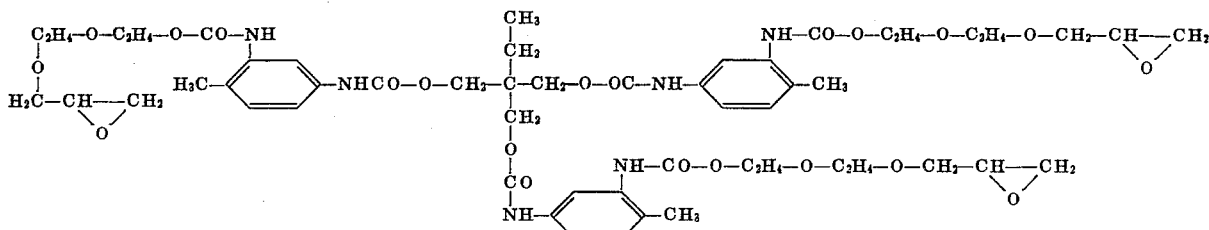

thoroughly mixed, then heated for 16 hours at 100° C., to furnish a hard casting of high-tensile strength and adhesion to glass.

Example 12

225.0 grams of polybutyleneglycol (mean molecular weight 900; hydroxyl equivalent weight 450) were mixed with 87.0 g. (0.5 mol) of toluylene-2,4-diisocyanate. The reaction mixture was maintained at 37° to 38° C. initially by slight cooling and subsequently by heating, until after about 45 minutes the isocyanate equivalent weight of the mixture approached the calculated value of 624 (half of all isocyanate groups consumed). Then 81.0 g. (0.5 hydroxyl equivalent) of the crude butane-1,3-diol-monoglycidyl ether described above were added and 62.8 grams of the resulting epoxy resin together with 133 g. of hexahydrophthalic acid-diglycidyl ester (containing 6.4 epoxide equivalents per kg.) were heated to 50° C. and then thoroughly mixed with 59.4 g. of commercial trimethyl-hexamethylenediamine (mixture of isomers of 2,2,4-trimethyl- and 2,4,4-trimethyl-hexamethylenediamine). After a short vacuum treatment to remove the air bubbles, the mixture was poured into preheated stretch molds and heated for 3 hours at 90° C. The stretch specimens revealed the following properties:
Tensile strength  (VSM 77 101)  5.00 kg./mm.²
elongation at rupture  (VSM 77 101)  4 percent.

Example 14

2. 174 grams of toluylene-2,4-diisocyanate were mixed with 468 g. of polybutyleneglycol (mean molecular weight 936; mean hydroxyl equivalent weight 468) whereupon a weakly exothermic reaction set in. While excluding moisture and stirring the mixture it was maintained at 38° C. until the isocyanate equivalent weight reached 640 to 670, which was the case after about 2½ to 4 hours.

642 grams (0.95 isocyanate equivalents) of the preadduct obtained above, of isocyanate equivalent weight 675, were mixed with 150 g. (0.95 hydroxyl equivalents) of 98 percent butane-1,4-diol-monoglycidyl ether, and the whole was stirred and heated at 50° C. until isocyanate could no longer be detected. The product obtained was a viscous epoxy resin containing 1.31 epoxide equivalents per kg., consisting substantially of the compound of the formula

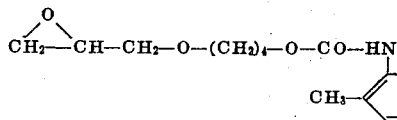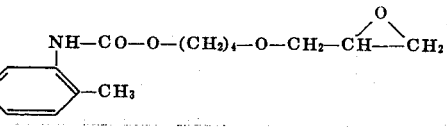

where $G_3$ represents the residue of the polybutyleneglycol HO—$G_3$—OH, whose terminal hydroxyl groups have been removed, having a mean molecular weight of 936 (=product I)

b. For comparison a viscous polyurethanepolyepoxy resin according to U.S. Pat. No. 2,830,038 to Patison was produced.

The compounds for the production of this resin are the same as used above, except that the butane-1,4-diol-monoglycidyl ether has been substituted for glycidol.

174 grams of toluylene-2,4-diisocyanate were mixed with 468 g. of polybutyleneglycol (mean molecular weight 936; mean hydroxyl equivalent weight 468, whereupon a weakly exothermic reaction set in. While excluding moisture and stirring the mixture it was maintained at 38° C. until the isocyanate equivalent weight reached 640 to 670, which was the case after about 1½ to 2 hours.

642 grams (1.038 isocyanate equivalents) of the preadduct obtained above, of isocyanate equivalent weight 620, were mixed with 78.5 g. (1.038 equivalents) of 98 percent glycidol freshly distilled, and the whole was stirred and heated at 60° C. until isocyanate could no longer be detected. The product obtained was a viscous epoxy resin containing 1.52 epoxide equivalent per kg., consisting substantially of the compound of the formula

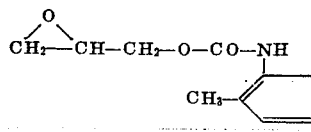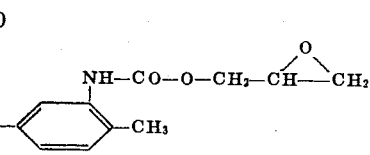

where $G_3$ represents the residue of the polybutyleneglycol HO—$G_3$—OH, whose terminal hydroxyl groups have been removed, having a mean molecular weight of 936 (=product II).

Viscosity data

1. Viscosity data of the polyurethanepolyepoxy resins according to example 14a [= product I] and example 14b [= product II]

| Viscosity at | | Product I | Product II |
|---|---|---|---|
| | 25° C. | 49.000 cP | 177.000 cP |
| | 40° C. | 13.450 cP | 38.000 cP |
| | 60° C. | 3.730 cP | 7.430 cP |

2. Initial viscosity and pot life of a curable mixture consisting of product I and bis(4-amino-3-methylcyclohexyl)methane (= mixture I) and a curable mixture consisting of product II according to U.S. Pat. No. 2,830,038 to Pattison and bis(4-amino-3-methylcyclohexyl)methane (= mixture II).

| | Mixture I | Mixture II |
|---|---|---|
| Product I (g.) | 100 | — |
| Product II (g.) | — | 100 |
| Bis(4-amino-3-methylcyclohexy)methane (g.) | 7,8 | 9,05 |
| Epoxide equivalents/kg. of the mixture | 1,31 | 1,52 |
| Initial viscosity (cP) | 11,500 | 45,000 |
| Pot life *) (hour) | 1 | 2 |

*) time in which the initial viscosity increased to twice the original value

As can be seen from the foregoing test results, the curable mixture consisting of product I and bis(4-amino-3-methylcyclohexyl)methane (= mixture I) has an initial viscosity of 11,500 cp. and the curable mixture consisting of product II according to U.S. Pat. No. 2,830,038 to Pattison and bis(4-amino-3-methylcyclohexyl)methane (= mixture II) has an initial viscosity of 45,000 cp. The time in which the initial viscosity increased to twice the original value is for the mixture I, 1 hour, and for the mixture II, 2 hours; that is to say, after staying for 1 hour, the initial viscosity of mixture I has only increased to Ca 23,000 cp which is the half value of the initial viscosity of mixture II.

We claim:
1. A polyepoxide of the formula

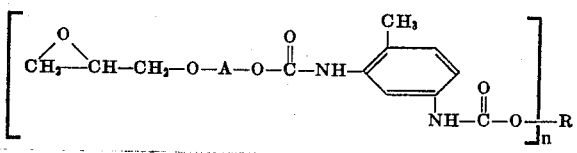

where $n$ is a whole number of at least 2 and at most 3, R is the radical which is obtained by removing the hydroxyl groups from a member selected from the group consisting of aliphatic saturated diol or triol of two to six carbon atoms, polyethylene glycol, polypropylene glycol and polybutylene glycol, A represents the radical which is obtained by removing the terminal hydroxyl groups from a member selected from the group consisting of glycol with four to six carbon atoms and diglycol with four to six carbon atoms.

2 A polyepoxide of the formula

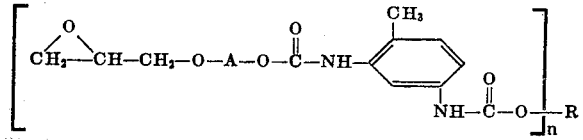

where $n$ is a whole number of at least 2 and at most 3, R is the radical which is obtained by removing the hydroxyl groups from a member selected from the group consisting of aliphatic saturated diol or triol of two to six carbon atoms, polyethylene glycol, polypropylene glycol and polybutylene glycol, A represents the radical which is obtained by removing the terminal hydroxyl groups from a member selected from the group consisting of butanediol-1,4, butanediol-1,3, 2,2-dimethylpropanediol-1,3, hexanediol-1,6 and diethyleneglycol.

3. A polyepoxide as claimed in claim 1 of the formula

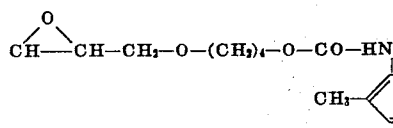 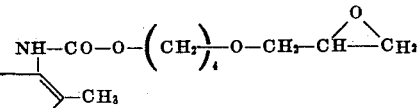

in which $G_1$ represents the residue of a polyethyleneglycol HO—$G_1$—OH, whose terminal hydroxyl groups have been removed, having a mean molecular weight of 412.

4. A polyepoxide as claimed in claim 1 of the formula

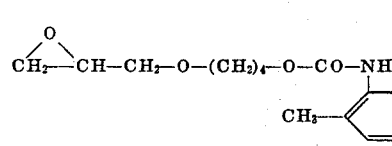 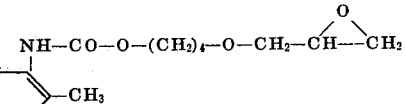

where $G_2$ is the residue of the polybutyleneglycol HO—$G_2$—OH, which has been freed from its terminal hydroxyl groups, of a mean molecular weight of 654.

5. A polyepoxide as claimed in claim 1 of the formula

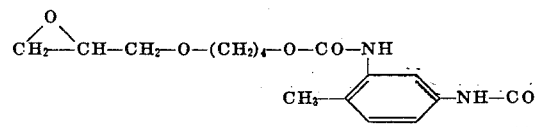 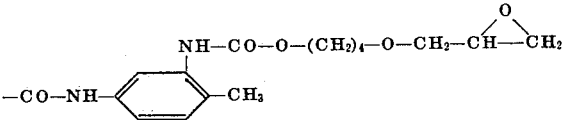

where $G_3$ represents the residue of the polybutyleneglycol HO—$G_3$—OH, whose terminal hydroxyl groups have been removed, having a mean molecular weight of 980.

6. A polyepoxide as claimed in claim 1 of the formula

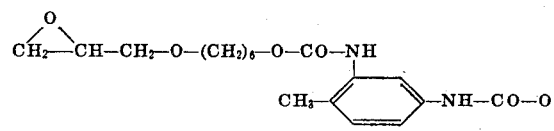 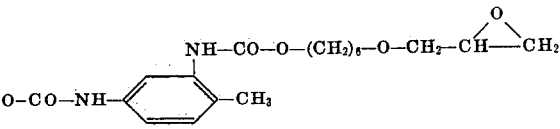

in which $G_4$ represents the residue of the polypropyleneglycol HO—$G_4$—OH, freed from its terminal hydroxyl groups, of mean molecular weight 440.

7. A polyepoxide as claimed in claim 1 of the formula

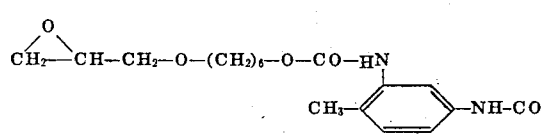 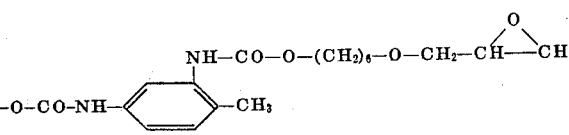

in which $G_5$ represents the residue of the polypropyleneglycol HO—$G_5$—OH, whose terminal hydroxyl groups have been removed, having a mean molecular weight of 874.

8. A polyepoxide as claimed in claim 1 of the formula

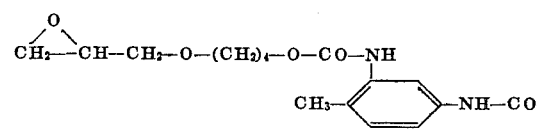 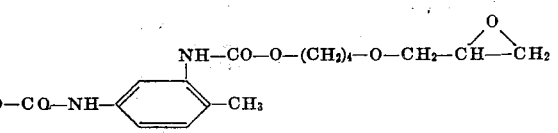

9. A polyepoxide as claimed in claim 1 of the formula

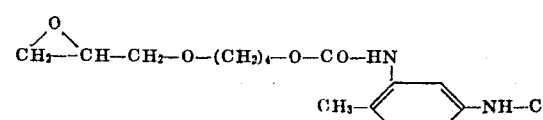 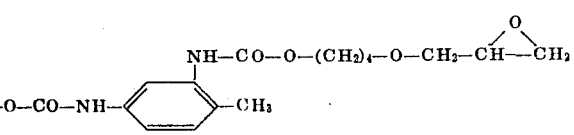

10. A polyepoxide as claimed in claim 1 of the formula

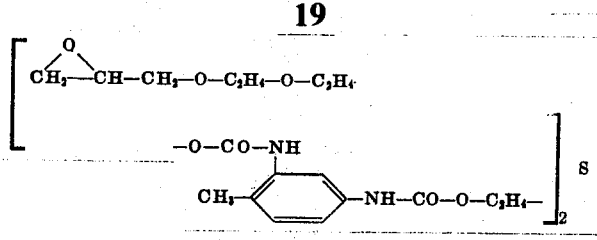

11. A polyepoxide as claimed in claim 1 of the formula

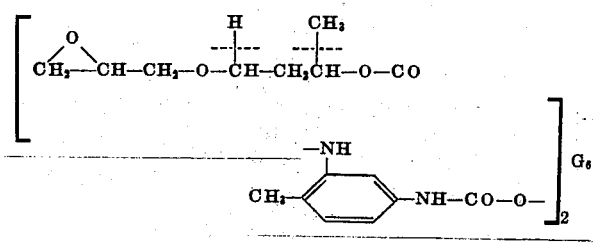

in which $G_6$ represents the residue of the polybutyleneglycol $HO-G_6-OH$, whose terminal hydroxyl groups have been removed, of mean molecular weight 900.

12. A polyepoxide as claimed in claim 1 of the formula

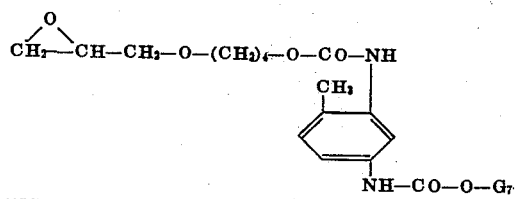

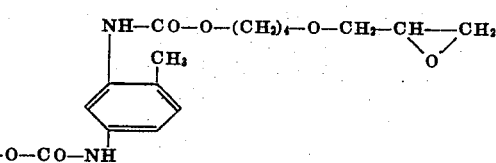

13. A polyepoxide as claimed in claim 1 of the formula

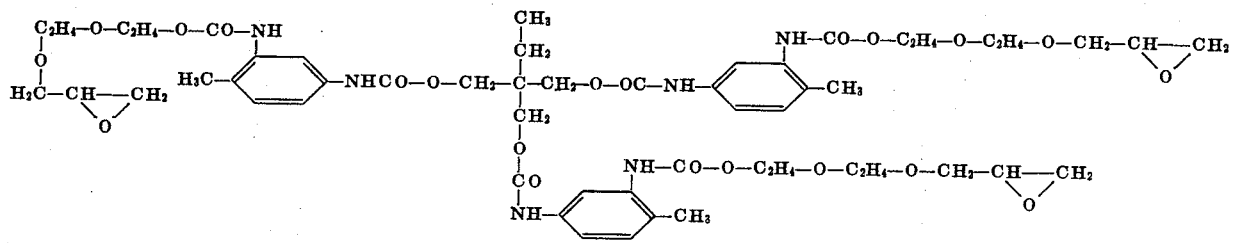

where $G_7$ is the residue obtained by removing the terminal hydroxyl groups from a polyester with terminal hydroxyl groups, said polyester being prepared by condensation of 4 mols of sebacic acid and 5 mols of hexane-1,6-diol.

14. A polyepoxide as claimed in claim 1 of the formula

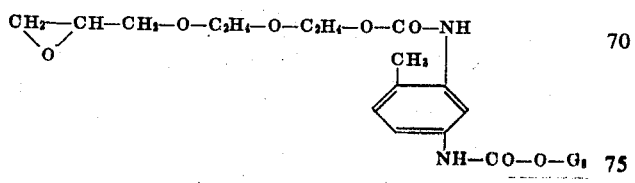

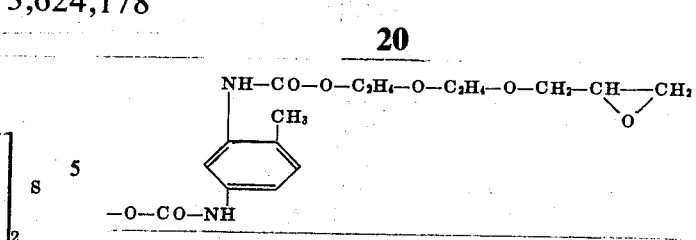

where $G_8$ is the residue obtained by removing the terminal hydroxyl groups from a polyester with terminal hydroxyl groups, said polyester being prepared by condensation of 4 mols of adipic acid and 8 mols of butane-1,4-diol.

15. Curable mixture of (1) the polyepoxide of the formula

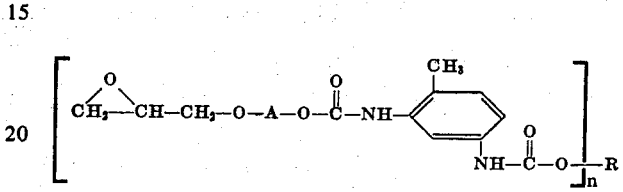

where $n$ is a whole number of at least 2 and at most 3, R is the radical which is obtained by removing the hydroxyl groups from a member selected from the group consisting of aliphatic saturated diol or triol of two to six carbon atoms, polyethylene glycol, polypropylene glycol and polybutylene glycol, A represents the radical which is obtained by removing the terminal hydroxyl groups from a member selected from the group consisting of glycol with four to six carbon atoms and diglycol with four to six carbon atoms and (2) a curing agent for the polyepoxide (1).

16. Curable mixture of (1) the polyepoxide of the formula

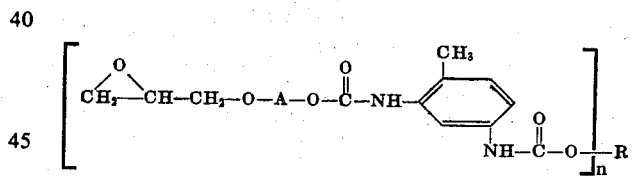

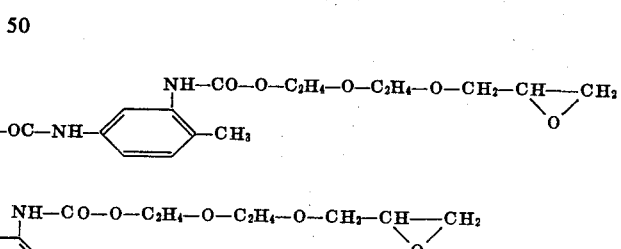

where $n$ is a whole number of at least 2 and at most 3, R is the radical which is obtained by removing the hydroxyl groups from a member selected from the group consisting of aliphatic saturated diol or triol of two to six carbon atoms, polyethylene glycol, polypropylene glycol and polybutylene glycol, A represents the radical which is obtained by removing the terminal hydroxyl groups from a member selected from the group consisting of glycol and diglycol with four to six carbon atoms, (2) a curing agent for polyepoxide compounds and (3) the diglycidyl ether of a glycol or polyglycol.

* * * * *

UNITED STATES PATENT OFFICE
CERTIFICATE OF CORRECTION

Patent No. 3,624,178                    Dated November 30, 1971

Inventor(s) Fredrich Lohse et al

It is certified that error appears in the above-identified patent and that said Letters Patent are hereby corrected as shown below:

Columns 17-18, claim 3, the middle of the structural formula should read ---

---.

Columns 17-18, claim 4, the middle of the structural formula should read ---

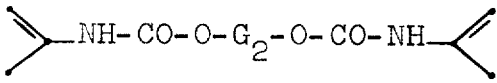

---.

Columns 17-18, claim 5, the middle of the structural formula should read ---

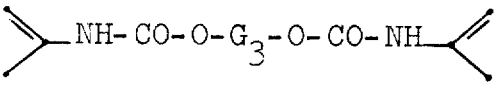

---.

Columns 17-18, claim 6, the structural formula should read ---

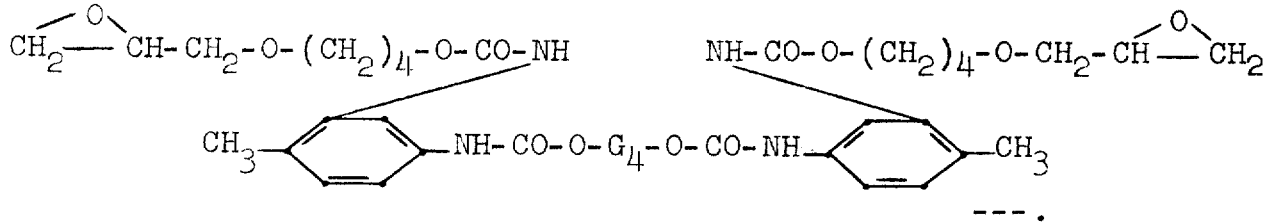

---.

PO-1050
(5/69)

UNITED STATES PATENT OFFICE
CERTIFICATE OF CORRECTION

Patent No. 3,624,178                     Dated November 30, 1971

Inventor(s) Fredrich Lohse et al

It is certified that error appears in the above-identified patent and that said Letters Patent are hereby corrected as shown below:

Columns 17-18, claim 7, the structural formula should read

---

$$CH_2\!\!-\!\!\overset{O}{\frown}\!\!CH\text{-}CH_2\text{-}O\text{-}(CH_2)_4\text{-}O\text{-}CO\text{-}HN\!\!-\!\!\!\!\bigcirc\!\!\!\!-\!\!NH\text{-}CO\text{-}O\text{-}C_5\text{-}O\text{-}CO\text{-}NH\!\!-\!\!\!\!\bigcirc\!\!\!\!-\!\!NH\text{-}CO\text{-}O\text{-}(CH_2)_4\text{-}O\text{-}CH_2\text{-}CH\overset{O}{\frown}CH_2$$

with $CH_3$ substituents on the benzene rings

---.

Columns 17-18, claim 8, the structural formula should read

---

$$CH_2\!\!-\!\!\overset{O}{\frown}\!\!CH\text{-}CH_2\text{-}O\text{-}(CH_2)_6\text{-}O\text{-}CO\text{-}NH\!\!-\!\!\!\!\bigcirc\!\!\!\!-\!\!NH\text{-}CO\text{-}O\text{-}(CH_2)_2\text{-}O\text{-}CO\text{-}NH\!\!-\!\!\!\!\bigcirc\!\!\!\!-\!\!NH\text{-}CO\text{-}O\text{-}(CH_2)_6\text{-}O\text{-}CH_2\text{-}CH\overset{O}{\frown}CH_2$$

with $CH_3$ substituents on the benzene rings

---.

Columns 17-18, claim 9, the structural formula should read

---

$$CH_2\!\!-\!\!\overset{O}{\frown}\!\!CH\text{-}CH_2\text{-}O\text{-}(CH_2)_6\text{-}O\text{-}CO\text{-}HN\!\!-\!\!\!\!\bigcirc\!\!\!\!-\!\!NH\text{-}CO\text{-}O\text{-}(CH_2)_6\text{-}O\text{-}CO\text{-}NH\!\!-\!\!\!\!\bigcirc\!\!\!\!-\!\!NH\text{-}CO\text{-}O\text{-}(CH_2)_6\text{-}O\text{-}CH_2\text{-}CH\overset{O}{\frown}CH_2$$

with $CH_3$ substituents on the benzene rings

---.

Signed and sealed this 27th day of June 1972.

(SEAL)
Attest:

EDWARD M. FLETCHER, JR.          ROBERT GOTTSCHALK
Attesting Officer                Commissioner of Patents